(12) United States Patent
Hinckers (10) Patent No.: US 11,719,321 B2
(45) Date of Patent: Aug. 8, 2023

(54) FLYWHEEL AND METHOD FOR PRODUCING A FLYWHEEL

(71) Applicant: Mühlhoff Umformtechnik GmbH, Uedem (DE)

(72) Inventor: Hubert Hinckers, Goch (DE)

(73) Assignee: Mühlhoff Umformtechnik GmbH, Uedem (DE)

( * ) Notice: Subject to any disclaimer, the term of this patent is extended or adjusted under 35 U.S.C. 154(b) by 49 days.

(21) Appl. No.: 16/609,517

(22) PCT Filed: May 2, 2018

(86) PCT No.: PCT/EP2018/061204
§ 371 (c)(1),
(2) Date: Oct. 30, 2019

(87) PCT Pub. No.: WO2018/202710
PCT Pub. Date: Nov. 8, 2018

(65) Prior Publication Data
US 2020/0141480 A1    May 7, 2020

(30) Foreign Application Priority Data
May 5, 2017 (DE) ...................... 10 2017 109 726.0

(51) Int. Cl.
*F16H 55/06* (2006.01)
*F16F 15/315* (2006.01)
*F16H 55/17* (2006.01)

(52) U.S. Cl.
CPC ......... *F16H 55/06* (2013.01); *F16F 15/3153* (2013.01); *F16H 55/17* (2013.01)

(58) Field of Classification Search
CPC ...... F16H 55/06; F16H 55/17; F16F 15/3153; F16F 15/305; F16F 15/30; F16F 15/1203; B21D 53/26; B21D 53/28
See application file for complete search history.

(56) References Cited

U.S. PATENT DOCUMENTS

| 2013/0193802 A1 | 8/2013 | Miyaoka et al. |
| 2015/0122066 A1* | 5/2015 | McCombs ............... F16F 15/30 74/433.5 |
| 2016/0069416 A1* | 3/2016 | Kowalski ............... F16F 15/129 74/433.5 |

FOREIGN PATENT DOCUMENTS

| CN | 101709765 A * | 5/2010 | ............. F16F 15/30 |
| DE | 85 01 367 | 5/1985 | |

(Continued)

OTHER PUBLICATIONS

TATA Steel, pp. 1,2 (Year: 2014).*
Hinckers, Machine translation of WO 2016023715A1,2016, obtained from FIT database. (Year: 2016).*

*Primary Examiner* — Thomas C Diaz
(74) *Attorney, Agent, or Firm* — Clark & Brody LP (57) ABSTRACT

A method for producing a flywheel includes producing a damping plate part by permanently connecting at least a first metallic plate element provided for the flywheel to at least one further material layer to form a sandwich component. According to the method, the first plate element is connected by a joining process to at least a second, parallel plate layer, so that they lie on one another to form a disc-shaped structural unit. According to the method, at least two sheet metal layers from different materials and/or at least two sheet metal layers having different material strengths are connected with each other. This enables a large variance for the production of flywheels. In this way, it is possible, for example, to produce a flywheel having a plurality of superimposed plates adapted to the respective load situation in a defined flexibility.

31 Claims, 4 Drawing Sheets

(56) References Cited

FOREIGN PATENT DOCUMENTS

| | | | |
|---|---|---|---|
| DE | 600 08 991 | 1/2005 | |
| DE | 102004021609 A1 * | 12/2005 | ............ F16H 55/14 |
| DE | 602 19 270 | 12/2007 | |
| DE | 10 2011 001 881 | 10/2012 | |
| DE | 10 2012 100278 | 7/2013 | |
| DE | 10 2014 111581 | 2/2016 | |
| DE | 102014111581 A1 * | 2/2016 | ............ F16H 55/06 |
| EP | 0 251 243 | 1/1988 | |
| EP | 2511566 A2 * | 10/2012 | ......... F16F 15/1203 |
| JP | 61-56743 | 3/1986 | |
| WO | WO-2016023715 A1 * | 2/2016 | ............ B21D 53/26 |

\* cited by examiner

FLYWHEEL AND METHOD FOR PRODUCING A FLYWHEEL

FIELD OF THE INVENTION

The present invention relates to a method for producing a flywheel, in which a damping plate part is produced by permanently connecting at least a first metallic plate element provided for the flywheel to at least a second, parallel plate layer by a joining process so that they lie on one another to form a disc-shaped structural unit.

BACKGROUND ART

Flywheels in terms of the present invention are, in particular, flywheels for vehicles, such as passenger cars and lorries, and that being both so-called automatic flywheels as well as manual flywheels (dual-mass flywheels) as they are used, for example in start/stop automatic systems of vehicles, however, also in the case of flywheels used for motor vehicles without start/stop automatic systems, meaning standard flywheels or also flywheels for any other transmission variants.

The disadvantage of the well-known flywheels include the disturbing noises in driving mode.

In DE 602 19 270 T2, a sound-damping starter flywheel is described where an element made of a viscoelastic material is arranged between the radial surface lying on the outer circumferential end section of a carrier and the radial mating surface lying on the inner circumferential end section of a ring gear, which is subjected to compressive stress in the radial and in the axial direction. In the case of this element, it has to do with a ring seal, which is pressed into a groove of the carrier, thereby being subjected to stress.

DE 600 08 991 T2 describes a flywheel of an internal combustion engine with an auxiliary starter ring gear. In order to reduce the noise level, here, a ring made of a formable elastomer material is attached by means of gluing between a circumferential surface of a carrier of the flywheel and a complementary circumferential surface of a ring gear attached onto the flywheel. In addition, a lining made of elastomer or plastomer can be attached onto a radial surface between the carrier and the ring gear, which extends at approximately a right angle to the circumferential surface in order to allow for a sliding contact between the carrier and the ring gear. The noise reduction should thus be achieved here by allowing for a forming of the ring gear radially towards the shaft of the flywheel.

In DE 10 2011 001 881 A1, a method for the production of a flywheel with the features of the above-mentioned generic class is described, in which a damping plate part made of a composite material comprising a layer made of sheet steel and a viscoelastic insulating layer permanently is firmly connected to a metallic base element provided as a flywheel in a joining process under pressure and partially being reshaped into a sandwich component. As an alternative, an insulating layer and/or an adhesive with similar material properties can also be used. Here, the component for the flywheel is constructed from a plurality of layers having a sandwich construction, of which at least one layer, preferably an inner layer, is a viscoelastic insulating layer. The damping plate part made of the composite material steel/insulating layer must be produced separately in the case of this known method. Experiences with this known method have shown that adhesions in the tools due to the material of the viscoelastic insulating layer can unfavourably result. The forming and joining tools have to be cleaned in such a case, which results in additional effort and delays during the production process.

Furthermore, tests involving the sandwich components known from DE 10 2011 001 881 A1 have shown that no forces are transferred via the damping plate part with the viscoelastic insulating layer. In addition, the stiffness of the sandwich component has been increased in an unfavourable way.

In DE 10 2014 111 581 A1, a method for the production of a flywheel with the features of the above-mentioned generic class is described, in which the first plate element with at least a second parallel plate layer lying on one another without a viscoelastic layer in between by connecting to form a disc-shaped structural unit by means of the joining process.

SUMMARY OF THE INVENTION

Using the aforementioned prior art as a basis, the object of the present invention is to provide an alternative method for the production of a flywheel, which results in a flywheel with vibration-insulating and noise-insulating properties and avoids the aforementioned disadvantages. Furthermore, the object of the present invention is to provide a flywheel with further improved properties.

The solution to this task provides a method for the production of a flywheel of the aforementioned generic class and a flywheel made by the production method and one that includes a damping plate part.

According to the invention, it is provided that at least two plate layers made from different materials and/or at least two plate layers having different material strengths are connected to each other.

According to the invention, the first plate layer has a greater plate thickness so that this first plate layer can absorb the greater proportion of the torque load when the engine is started and in driving mode. The second plate layer is used here to supplement the torque absorption and is constructed with a thinner plate thickness.

The thinner second plate layer has the effect of dampening the noise behaviour and creates a greater flexible behaviour of the flywheel in driving mode. Preferably, therefore, if two plate layers are used according to the invention, the first plate layer has a greater plate thickness than the second plate layer.

Furthermore, in accordance with a variant of the invention, in the case of two plate layers, the first plate layer is made of a softer steel material than the second plate layer.

For example, according to the invention, when using two plate layers with a different material strength according to the invention, it can be that the first plate layer has a plate thickness of more than 1 mm, preferably a plate thickness of more than 1.5 mm, and that the second plate layer has a plate thickness of less than 1 mm.

It has already been mentioned that it is favourable if, for example, when using two plates, the first plate consists of a softer steel material than the second plate. For example, the first plate layer can consist of a thermomechanically rolled low-carbon high-strength steel material with a minimum yield strength of 355 N/mm$^2$ that is suitable for cold forming, while the second plate layer consists of a thermomechanically rolled low-carbon high-strength and cold forming steel material with a minimum yield strength of 700 N/mm$^2$.

In the present method, more than two plate layers can be joined together. For example, in this case, a plurality of plate layers each comprising plate layer pairing combinations each consisting of two plate layers with a different material strength and/or different steel materials respectively can be joined together.

Within the context of the method according to the invention, one can also, for example, connect at least two plate layers to each other having shaping contours that are at least different in their original state before the joining process.

The concept of the present invention enables a large variance for the production of flywheels. In this way, it is possible, for example, to produce a flywheel having a plurality of plates on one another according to this concept depending on the respective load situation and flexibility. Due to different plate thickness pair combinations and also different material grades, flywheels can be designed for high and lower loads.

The extraordinarily high flexible behaviour of the flywheels in accordance with this concept enables a low axial pressure on the engine bearing with large torque transmission of the drive train simultaneously. An additional advantage is the low noise level mentioned above.

Flywheels, which are produced according to the method according to the invention, have a number of advantages. They have a high degree of flexibility for tolerance/movement compensation at each motor revolution. They have a low net weight, in particular, since individual plates with different (sometimes smaller) outer diameters can be used.

The method step in the production of flywheels, in which the connection of two or more plate layers is provided, can be carried out within the scope of an automatic transfer operation.

The possibility of producing flywheels with a maximized torque transmission is created by means of the more variable use of plate thicknesses and material grades. In this way, an exact individual design of a flywheel in accordance with a defined requirement profile can be achieved.

The flywheels according to the invention have a very high level of sound attenuation. They have a lower axial stiffness compared to flywheels consisting of a mono plate.

Furthermore, one can, for example, connect at least two plate layers to each other having cut contours that are at least different in their original state before the joining process.

According to the present invention, the disc-shaped sandwich component of the carrier disc of a flywheel made of two or a plurality of plate layers without intermediate of a viscoelastic material is joined, i.e. a double plate or multiple plate is produced. This double-plate principle means that the power transmission from the crankshaft is not transferred like it was up until this point from one, but from two or a plurality of plate layers on one another with different materials and/or different material strengths.

The production of such carrier discs according to the double-plate principle firstly results in advantages in the field of acoustics. Due to the low load on the adjacent components, disturbing resonance noise is minimized. For this purpose, a good sound attenuation is achieved by the two- or multi-layer construction. Noises generated by the retracting starter in the case of a flywheel are significantly reduced and are only vaguely perceptible. This is particularly advantageous in the case of a flywheel for a modern start/stop system.

Furthermore, there are economic benefits to the production of the flywheel. The previously required sound-damping plate with viscoelastic layer is done without. In the above-mentioned known method, such a sound-damping plate had to be produced in a separate operation and be joined together with the plate part of the carrier disc. The method according to the invention reduces the number of necessary operations and is therefore more cost-effective.

Furthermore, it is advantageous that, in the case of the solution according to the invention, the load of other motor components is reduced. Due to the double-plate principle, a higher axial and radial flexibility is achieved with the same level of power transmission. This leads to a reduction in the load on the bearings in the gearbox and engine due to the significantly lower level of stiffness achieved. Also, by doing without the previously used sound-damping plate with a viscoelastic layer, the total weight of the carrier disc is reduced. The resulting low-level mass moment of inertia relieves the adjacent components, which in turn can be designed with smaller dimensions.

Unlike in previous solutions, according to the invention, the damping is no longer carried out between the carrier and the ring gear of the flywheel, but practically in the carrier component (corresponds now to the sandwich-like damping plate part) of the flywheel itself and thereby across the entire surface so that the carrier component is essentially designed to dampen vibration and noise throughout the entire extent of its surface. In the joining process, two or a plurality of principally round plate elements with a disc-shaped basic shape are joined in the direction of their axis in such a way that they then form a multi-layered composite, wherein they are connected to each other with their surfaces facing each other. The plate layers to be connected to each other each have a similar disc-like geometric basic shaped contours, but can differ from each other with regard to details. It can also additionally have corresponding or different formations perpendicular to the plane of the disc shape.

Preferably, it is proceeded in such a way that the sandwich component comprising the first plate element, the second plate layer and, if applicable, further plate layers is formed at least partially out of the main plane of the disc-shaped sandwich component according to the shape of the flywheel, and perforations or punchings are carried out on it if applicable. The two plate layers can be joined under pressure to form a component. As a rule, the entire arrangement is pressed during this joining process in such a way that the initial layers are permanently firmly connected to each other.

The joining process of the plate layers can also include, for example, an additional mutual fixation of the plate layers in the radial direction by means of being clipped in.

It can be provided in a possible variant of the invention that, for example, only one plate layer of the disc-shaped sandwich component in a radially outer edge region obtains an upturn or bend, which the second or further plate layers do not have.

According to a preferred variant of the invention, the plate layers of the disc-shaped sandwich component lying on one another have no mutual fixation to each other so that, in the radial direction and/or in the axial direction, relative position changes of the plate layers to each other in the micro-range are possible.

The basic shape of the flywheel or the carrier disc of the flywheel can be specified, for example, by a first plate layer of the sandwich component and, during the joining process, the second or further plate layers nestle in a positive-locking manner into this basic form so that a flywheel is obtained in the desired shape with an at least two-layer construction.

It can also be favourable if the joining process of the plate layers comprises an additional fixation of both components by means of retaining tabs.

In the context of the present invention, in principle, a wide variety of material combinations are taken into consideration. Preferably, the plate layers of the sandwich component consist of a non-alloy cold-formed steel sheet.

The joining of the plate layers is preferably done under a press, wherein the pressure to be applied during the joining process naturally depends on the material pairing combination, as well as on the material strength of the plate layers used. The contact pressure applied to the plate layers to be connected can thus vary over wide ranges and, for example, lie in the range of one or more bar or are also significantly higher.

After the joining process, further operations usually follow, for example, forming and cutting operations, wherein such procedures can of course also take place before the joining process. As a rule, an outer ring gear is also attached to the flywheel after the joining process. Other components of the flywheel can be riveted, welded or screwed on for example.

The object of the present invention is furthermore a flywheel designated for a starter of a motor vehicle, which is produced according to a method as has been previously described. Such a flywheel can be used in a motor vehicle, for example, in the area of a start/stop device. Due to the noise reduction according to the invention, the disturbing noises produced during starting are greatly reduced in a favourable manner, which is particularly advantageous for motor vehicles with these devices since these noises occur significantly more frequently as is the case with conventional vehicles. during these starting operations.

However, the use of the flywheels according to the invention is also useful in motor vehicles with conventional starters.

The features described in the subclaims relate to preferred further embodiments of the task solution according to the invention. Further advantages of the present invention result from the following detailed description.

BRIEF DESCRIPTION OF THE DRAWINGS

In the following, the present invention is explained in more detail on the basis of exemplary embodiments with reference to the enclosed drawings. The figures show.

DETAILED DESCRIPTION OF THE INVENTION

Figure 1:
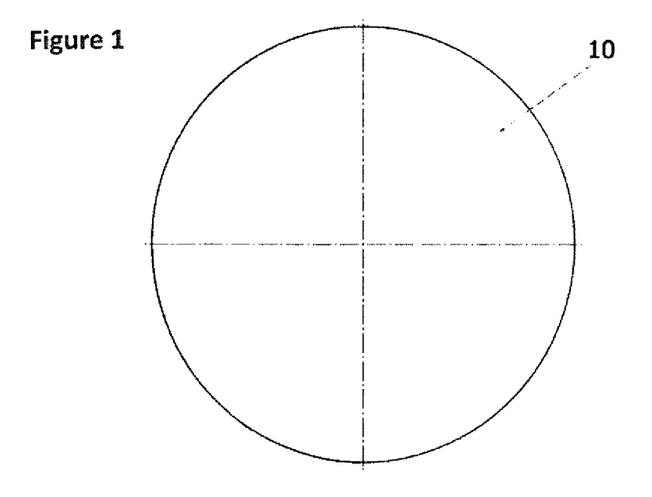
FIG. 1 is a view of a disc-shaped output plate, which forms the basis for the production of the flywheel.

FIG. 1 shows a disc-shaped sheet metal blank for a flywheel according to the invention before forming and further processing.

Figure 2:
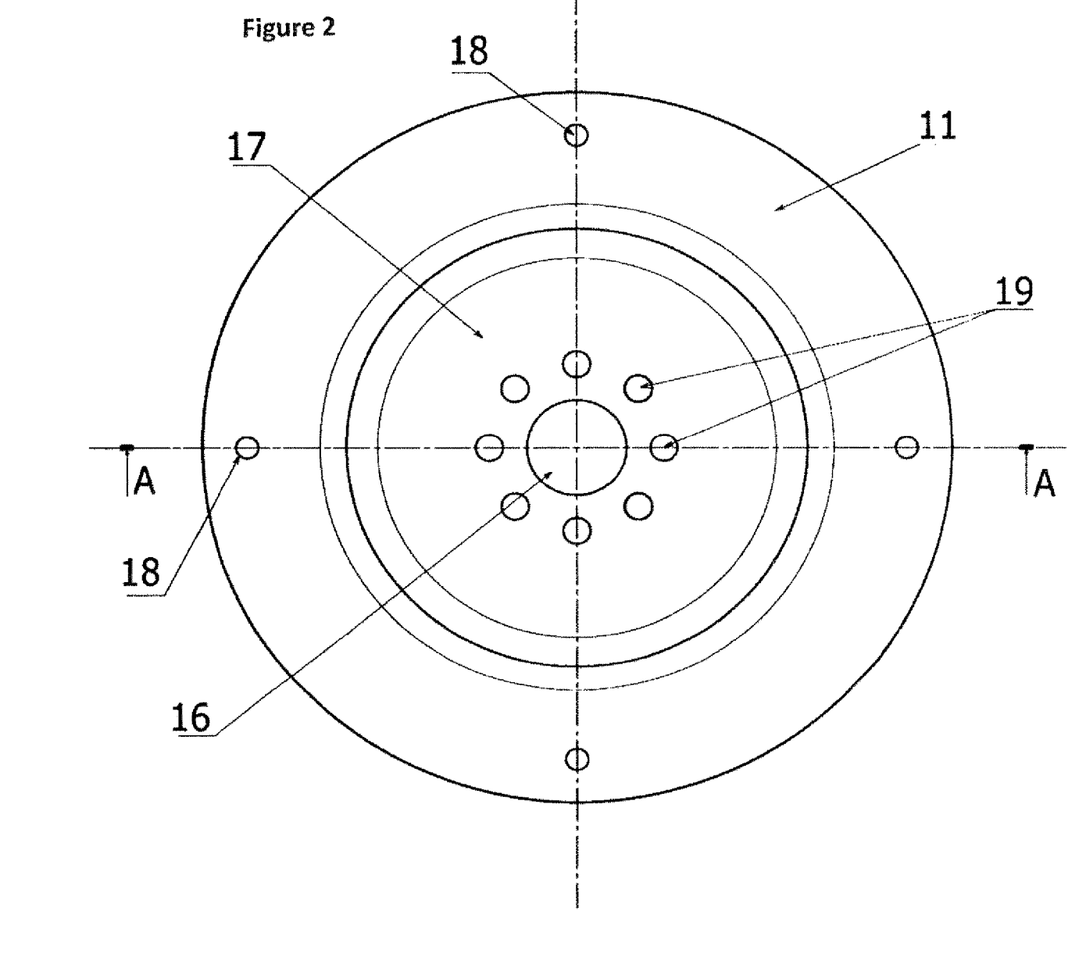
FIG. 2 a view of a double plate according to the invention for a flywheel.

In the following, reference is made to FIG. 2. This shows in perspective a double plate for a flywheel indicated overall with the reference number 10, which was produced according to the method according to the invention. In principle, such a double plate 10 has the shape of a disc-shaped base body made of sheet metal, which is also referred to here as the carrier disc. On the outer circumference of this disc-shaped base body, for example, a ring gear (not shown here) is attached around a ring gear, for example, being welded.

The disc-shaped base body 10 has holes in different regions usually distributed across the circumference. For example, such perforations with smaller holes 18 in the region of an outer ring-shaped flat flange 11 of the carrier disc are present, each distributed at a spacing from one another across the circumference of the carrying disc 10. In addition to these smaller holes 18, for example, holes 19 may be present in other places, for example in a radial inner region 17 of the carrier disc. The hole pattern, the shape and quantity of the various holes 18, 19 is not relevant in the context of the present invention since, in principle, it rather has to do with the type of production and the structure of the flywheel according to the invention.

Figure 3:
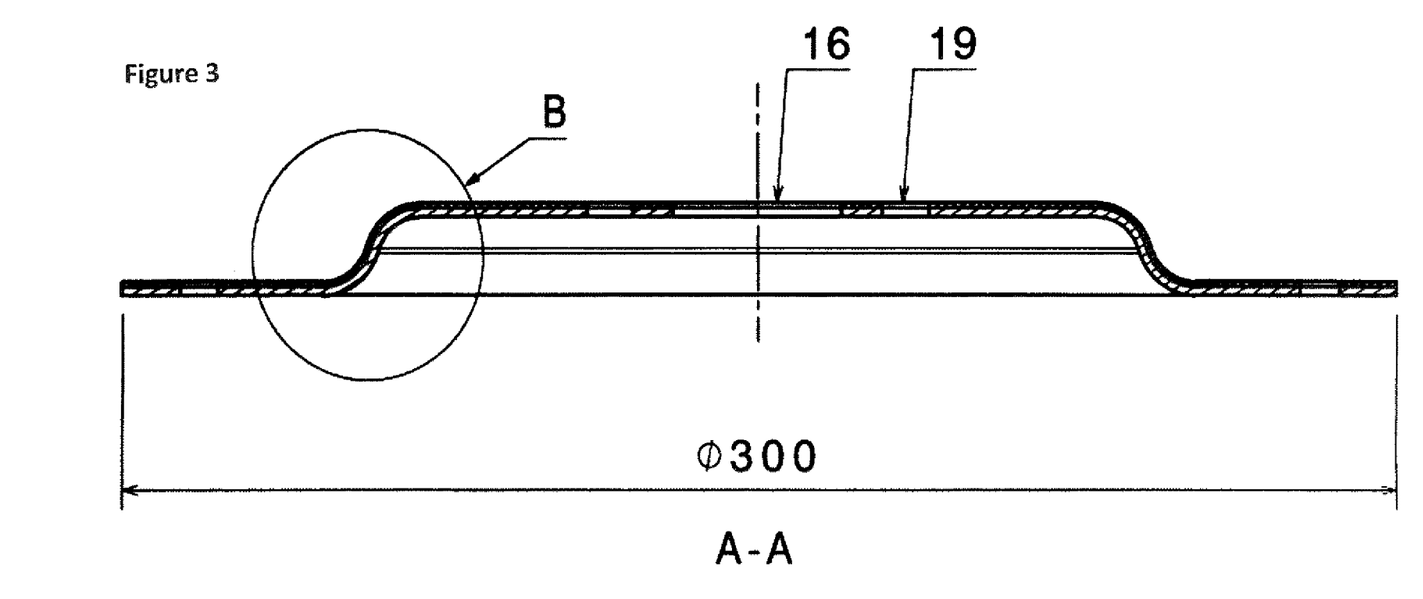
FIG. 3 a schematically simplified sectional view through the double plate according to the invention along the section line A-A in FIG. 2.

As can be recognized in FIG. 3, the above-mentioned central region 17 of the flywheel is formed by means of a forming method from the plate of the disc-shaped base body 10 so that this central region 17 is raised with relation to the regions adjoining radially towards the outside. This central region has a centre hole 16, wherein there is perforated ring with a plurality of the smaller holes 19, which concentrically surround the centre hole 16. However, these constructive details regarding the structure of the flywheel are not decisive for the present invention since it rather depends here more on the method of production of the disc-shaped base body 10, which, as one can recognize from FIGS. 3 and 4, a sandwich-like component is made of at least two plate layers.

Figure 4:
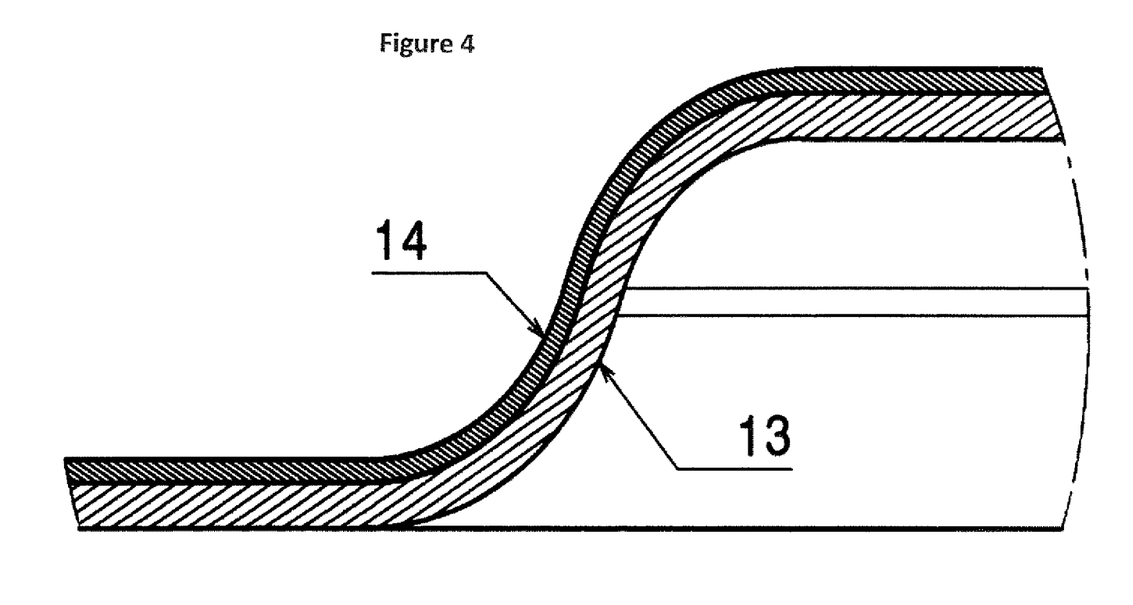
FIG. 4 an enlarged detailed view of a section B from the double plate in accordance with the representation of FIG. 3.

This sandwich-like structure of the disc-shaped base body is explained below with reference to the sectional views in accordance with FIGS. 3 and 4. As you can easily see there, the disc-shaped base body 10 consists of a double plate, i.e. there are two plate layers parallel to each other in most regions, 13, 14, which are on one another and in principle against each other. As can be seen from FIG. 4, the first plate layer below is designed with a larger material strength of more than one mm, for example, a material strength of 1.8 mm. In comparison, the plate thickness of the second plate layer 14, which forms the upper plate layer here, is lower and lies, for example, in a range of less than 1 mm, for example, here the plate thickness of the second plate layer 14 is about 0.8 mm, which is less than half the plate thickness of the first plate layer is 13.

Furthermore, the two plate layers 13, 14 in this example consist of different steel materials, wherein the first lower plate layer 13 in the example consists of a softer steel material, for example, made of the material S355MC, while the second upper plate layer 14 consists of a harder steel material, for example, made of the material S700MC, which has a higher minimum yield strength of 700 N/mm$^2$ compared to the first steel material, while the first softer steel material has only a minimum yield limit 355 N/mm$^2$.

In a joining process under pressure, these two plate layers 13, 14 on one another are permanently firmly connected to each other to form a sandwich component. Experiments with regard to the noise-damping properties of such a flywheel in operation during an opening operation have shown that such a sandwich-like double plate reacts softer than a single plate when forces are applied. On the outside via the ring gear, the flywheel is connected to the gearbox during operation. In the ring gear, for example, a pinion (not shown here) engages when the flywheel is used in a start/stop device of a starter. In the central region 17, the carrier disc of the flywheel is connected to the crankshaft of the motor (these motors/gearbox elements are not shown in the present application.)

In the case of a forming of a flywheel according to the invention of 1 mm in the axial direction for example, only a force of approx. 1080 N must be applied, whereas this force is about twice as large in a conventional flywheel according to the prior art according to the prior art. As a result, important components, such as in bearings, are subjected to a significantly lower level of wear and the load of the crankshaft is considerably lower.

By doing without a viscoelastic layer, weight is saved compared to conventional solutions; the flywheel becomes lighter and has a lower mass moment of inertia. The noise-damping effect of the double plate is nevertheless very good. Instead of two plate layers on one another, three or a plurality plate layers can also be used if the corresponding application requires it.

The connection of the double plate to the two plate layers 13, 14 on the outer circumference with the ring gear of a fly wheel can be established via a weld seam for example. In their respective outer edge region, the two plate layers 13, 14 can each be shaped differently.

The two plate layers 13, 14 can also additionally be formed, for example, by means of clinching in such a way that a better mutual fixation results. This type of connection facilitates, for example, the transport of the components until assembly by welding.

According to a preferred method, the preparation of a damping plate part according to the invention, as well as a flywheel can be carried out, for example, with the following sequence of method steps:

the first plate layer 13 and the second plate layer 14 are inserted together in a press and are reshaped in this together according to the desired shape of the carrier disc to be produced in one or a plurality of steps;

if one of the plate layers in its radially outer region obtains an upturn or a bend,—which is not strictly necessary,—then this has the advantage that this results in a stiffening and a smoothing of the plate layer in the plane of the carrier disc;

the two plate layers are fixed to each other by means of clinching (This step is optional and not absolutely necessary.);

the two plate layers are then perforated together, according to the required hole pattern for the carrier disc plate to be produced;

the two plate layers are then preferably welded in their radially outer region both to each other as well as to a ring gear radially surrounding the plate layers on the outside;

in the radial inner region, the thus obtained carrier disc with a ring gear, which thus forms a flywheel, is connected by a screw connection to a crankshaft.

REFERENCE LIST

10 disc-shaped base body, carrier disc
11 outer ring-shaped region
13 first (lower) plate layer
14 second (upper) plate layer
16 centre hole
17 raised centre region
18 smaller holes on the outside
19 holes all around centre hole

The invention claimed is:

1. A method for producing a flywheel, in which a damping plate part is produced by connecting at least one substantially disc-shaped first metallic plate layer to at least one substantially disc-shaped second, parallel plate layer by a joining process so that the at least one substantially disc-shaped first metallic plate layer and the at least one substantially disc-shaped second, parallel plate layer lie on one another to form the flywheel, wherein the at least two plate layers are made of steels of different compositions and with different material thicknesses, and the at least one first metallic plate layer is made of a steel material with lower yield strength than the at least one second, parallel plate layer, and wherein the at least two plate layers have cut contours that are different from each other at least in their original state before the - connecting.

2. The method according to claim 1, characterized in that the at least one first metallic plate layer has a greater plate thickness than the at least one second, parallel plate layer.

3. The method according to claim 1, wherein the at least one first metallic plate layer has a plate thickness of more than 1 mm.

4. The method according to claim 1, wherein the at least one second, parallel plate layer has a plate thickness of less than 1 mm.

5. The method according to claim 1, wherein the at least one first metallic plate layer comprises a thermomechanically rolled low-carbon high-strength steel material with a minimum yield strength of 355 N/mm$^2$ that is suitable for cold forming.

6. The method according to claim 1, wherein the at least one second, parallel plate layer (14) comprises a thermo-mechanically rolled low-carbon high-strength steel material with a minimum yield strength of 700 N/mm$^2$ that is suitable for cold forming.

7. The method according to claim 1, wherein a plurality of plate layers comprising, in addition to the at least two plate layers, plate layer pairing combinations of two plate layers with different material thicknesses and/or respectively different steel materials are joined together.

8. The method according to claim 1, wherein the at least two plate layers have shaping contours that are different from each other at least in their original state before the connecting.

9. The method according to claim 1, wherein the at least two plate layers have different heat treatment before the connecting.

10. The method according to claim 1, wherein a disc-shaped sandwich component comprising the at least one first metallic plate element, the at least one second, parallel plate layer is at least partially formed by deforming a main plane of the disc-shaped sandwich component in accordance with the shape of the flywheel and applying perforations or punches on the disc-shaped sandwich component.

11. A method for producing a flywheel, in which a damping plate part comprises at least one substantially disc-shaped first metallic plate layer, and at least one substantially disc-shaped second, parallel plate layer, the at least one substantially disc-shaped first metallic plate layer and the at least one substantially disc-shaped second, parallel plate layer lie on one another to form the flywheel, the at least one substantially disc-shaped first metallic plate layer and the at least one substantially disc-shaped second, parallel plate layer are welded to each other in a radially outer region of the at least one substantially disc-shaped first metallic plate layer and the at least one substantially disc-shaped second, parallel plate layer and fixed to each other by a screw connection in a radially inner region of the at least one substantially disc-shaped first metallic plate layer and the at least one substantially disc-shaped second, parallel plate layer, but not additionally and mutually fixed to each other in an intermediate region between the radially outer region and the radially inner region, and, in a micro-range, the at least one substantially disc-shaped first metallic plate layer and the at least one substantially disc-shaped second, parallel plate layer are relatively movable in a radial direction and/or in an axial direction, wherein the at least two plate layers are made of steels of different compositions and with different material thicknesses, and the at least one first metallic plate layer is made of a steel material with lower yield strength than the at least one second, parallel plate layer.

12. A flywheel provided for a starter motor of a motor vehicle, the flywheel comprising a damping plate part, the damping plate part further comprising at least one substantially disc-shaped first metallic plate layer connected to at least one substantially disc-shaped second, parallel plate layer to form the flywheel, wherein the at least one substantially disc-shaped first metallic plate layer and the at least one substantially disc-shaped, second parallel plate layer are made of steels of different compositions and with different material thicknesses, and the at least one first metallic plate layer is made of a steel material with lower yield strength than the at least one second, parallel plate layer, wherein the at least two plate layers have cut contours that are different from each other.

13. The method according to claim 1, wherein the at least one first metallic plate layer has a plate thickness of more than 1.5 mm.

14. The method according to claim 10, wherein said disc-shaped sandwich component comprises further plate layers in addition to said at least one first metallic plate layer and said at least one second, parallel plate layer.

15. The flywheel according to claim 12, wherein the motor vehicle is a motor vehicle with an automatic start/stop system.

16. A flywheel provided for a starter of a motor vehicle, the flywheel comprising a damping plate part, the damping plate part further comprising at least one substantially disc-shaped first metallic plate layer and at least one substantially disc-shaped second, parallel plate layer, the at least one substantially disc-shaped first metallic plate layer and the at least one substantially disc-shaped second, parallel plate layer lie on one another to form the flywheel, the at least one substantially disc-shaped first metallic plate layer and the at least one substantially disc-shaped second, parallel plate layer are welded to each other in a radially outer region of the at least one substantially disc-shaped first metallic plate layer and the at least one substantially disc-shaped second, parallel plate layer and fixed to each other by a screw connection in a radially inner region of the at least one substantially disc-shaped first metallic plate layer and the at least one substantially disc-shaped second, parallel plate layer, but not additionally and mutually fixed to each other in an intermediate region between the radially outer region and the radially inner region, and, in a micro-range, the at least one substantially disc-shaped first metallic plate layer and the at least one substantially disc-shaped, parallel plate layer are relatively movable in a radial direction and/or in an axial direction,
wherein the at least two plate layers are made of steels of different compositions and with different material thicknesses, and the at least one first metallic plate layer is made of a steel material with lower yield strength than the at least one second, parallel plate layer.

17. The flywheel according to claim 16, wherein the motor vehicle is a motor vehicle with an automatic start/stop system.

18. A method for producing a flywheel, in which a damping plate part is produced by connecting at least one substantially disc-shaped first metallic plate layer to at least one substantially disc-shaped second, parallel plate layer by a joining process so that the at least one substantially disc-shaped first metallic plate layer and the at least one substantially disc-shaped second, parallel plate layer lie on one another to form the flywheel, wherein the at least two plate layers are made of steels of different compositions and with different material thicknesses, and the at least one first metallic plate layer is made of a steel material with lower yield strength than the at least one second, parallel plate layer, wherein a disc-shaped sandwich component comprising the at least one first metallic plate element, the at least one second, parallel plate layer is at least partially formed by deforming a main plane of the disc-shaped sandwich component in accordance with the shape of the flywheel and applying perforations or punches on the disc-shaped sandwich component.

19. The method according to claim 18, characterized in that the at least one first metallic plate layer has a greater plate thickness than the at least one second, parallel plate layer.

20. The method according to claim 18, wherein the at least one first metallic plate layer has a plate thickness of more than 1 mm.

21. The method according to claim 18, wherein the at least one second, parallel plate layer has a plate thickness of less than 1 mm.

22. The method according to claim 18, wherein the at least one first metallic plate layer comprises a thermomechanically rolled low-carbon high-strength steel material with a minimum yield strength of 355 N/mm$^2$ that is suitable for cold forming.

23. The method according to claim 18, wherein the at least one second, parallel plate layer comprises a thermomechanically rolled low-carbon high-strength steel material with a minimum yield strength of 700 N/mm$^2$ that is suitable for cold forming.

24. The method according to claim 18, wherein a plurality of plate layers comprising, in addition to the at least two plate layers, plate layer pairing combinations of two plate layers with different material thicknesses and/or respectively different steel materials are joined together.

25. The method according to claim 18, wherein the at least two plate layers have shaping contours that are different from each other at least in their original state before the connecting.

26. The method according to claim 18, wherein the at least two plate layers have different heat treatment before the connecting.

27. The method according to claim 18, wherein the at least one first metallic plate layer has a plate thickness of more than 1.5 mm.

28. The method according to claim 18, wherein said disc-shaped sandwich component comprises further plate layers in addition to said at least one first metallic plate layer and said at least one second, parallel plate layer.

29. The method according to claim 18, wherein the at least two plate layers have cut contours that are different from each other at least in their original state before the connecting.

30. A flywheel provided for a starter motor of a motor vehicle, the flywheel comprising a damping plate part, the damping plate part further comprising at least one substantially disc-shaped first metallic plate layer permanently connected to at least one substantially disc-shaped second, parallel plate layer to form the flywheel, wherein the at least one substantially disc-shaped first metallic plate layer and the at least one substantially disc-shaped, second parallel plate layer are made of steels of different compositions and with different material thicknesses, and the at least one first metallic plate layer is made of a steel material with lower yield strength than the at least one second, parallel plate layer, wherein a disc-shaped sandwich component comprising the at least one first metallic plate element, the at least one second, parallel plate layer is at least partially deformed from a main plane of the disc-shaped sandwich component in accordance with the shape of the flywheel and includes perforations or punches.

31. The flywheel according to claim 30, wherein the motor vehicle is a motor vehicle with an automatic start/stop system.

* * * * *